Oct. 13, 1942.           D. D. CHASE           2,298,820
                        REGULATOR SYSTEM
                       Filed Sept. 6, 1941

Inventor:
Delmar D. Chase,
by Harry E. Dunham
His Attorney.

Patented Oct. 13, 1942

2,298,820

UNITED STATES PATENT OFFICE 2,298,820

REGULATOR SYSTEM

Delmar D. Chase, Huntington Woods, Mich., assignor to General Electric Company, a corporation of New York Application September 6, 1941, Serial No. 409,788

4 Claims. (Cl. 290—7)

This invention relates to regulator systems and more particularly to an improved system for insuring stability of automatic-voltage-regulated synchronous dynamo-electric machines.

It is well known that the power which a synchronous dynamo-electric machine can transmit to or receive from a similar machine is a function of its excitation or field current. When the synchronous machine is driven by a prime mover of the type which is provided with a throttle such, for example, as a turbine or reciprocating engine, the throttle position will be an indication or function of the amount of load which the generator must transmit. Heretofore, it has been proposed to interconnect or interlock the excitation controlling means with the governor position so as to vary the extent to which the excitation can be lowered in inverse proportion to the degree of throttle opening, that is to say, the further the throttle is opened the smaller the degree of excitation lowering which will be permitted. This is especially advantageous in systems where the synchronous generator has its voltage controlled by an automatic regulator because circuit conditions may sometimes be such that the voltage regulator tries to lower the excitation in an attempt to lower the voltage at times when the power is increasing and hence the throttle position is opening with the result that without some interlock between the excitation controlling means and the load controlling means the synchronous machine is subject to instability and loss of synchronism.

In accordance with this invention there is provided a novel and simple automatic arrangement of this type which is characterized by the use of a switching means which is sequentially operated in accordance with changes in governor position and which is electrically interconnected to switching means which is operated in accordance with changes in the position of the rheostat which controls the generator excitation.

An object of the invention is to provide a simple and inexpensive stability control system for synchronous dynamo-electric machines.

Another object of the invention is to provide a simple and reliable control system for prime-mover-operated alternators.

The invention will be better understood from the following description taken in connection with the accompanying drawing and its scope will be pointed out in the appended claims.

Figure 1:
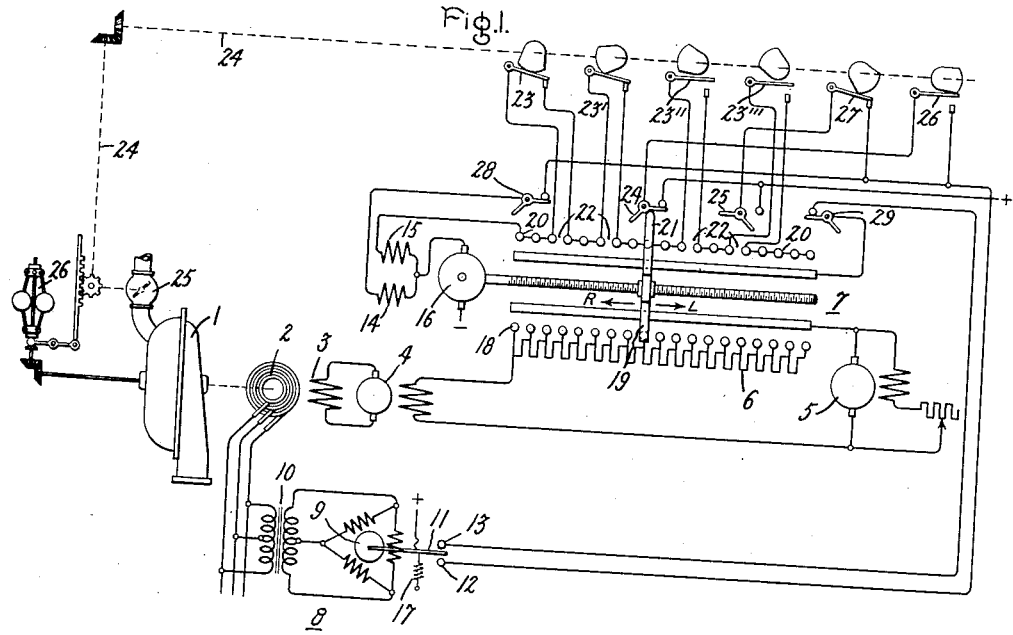
Figure 2:
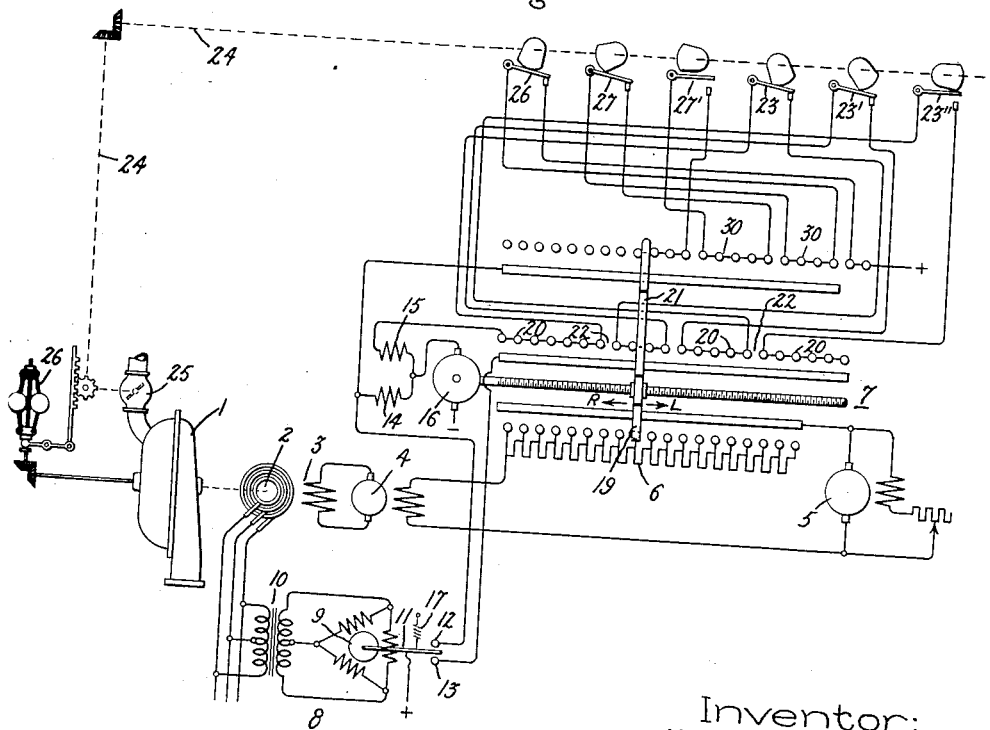

In the drawing Fig. 1 is a diagrammatic illustration of an embodiment of the invention and Fig. 2 is a similar illustration of a modification thereof.

Referring now to Fig. 1 of the accompanying drawing, there is disclosed therein a prime mover 1 for driving an alternator 2. The alternator has a field winding 3 energized by an exciter 4 which is separately excited by a pilot exciter 5 through the resistance element 6 of a motor-operated rheostat 7. For automatically controlling the rheostat there is provided a voltage regulator 8 comprising a torque motor 9 connected across the output circuit of the alternator by means of a potential transformer 10. The torque motor actuates a movable contact 11 which cooperates respectively with fixed raise and lower contacts 12 and 13 connected respectively to direction of rotation controlling field windings 14 and 15 of a servo motor 16 for driving the rheostat 7. The torque of the torque motor 9 is counterbalanced by a spring 17 when the voltage of the alternator is normal.

It should be understood that the regulator has been reduced to its barest essentials for the sake of simplicity and brevity because my invention is not limited to any particular form of regulator. In practice, however, it will usually be desirable to interpose auxiliary relays between the contacts of the regulator and the motor 16 and it will sometimes be desirable to add auxiliary contacts to the regulator for controlling high speed raising and lowering contactors, as described in detail in Patent 1,848,852, granted March 8, 1932, on an application of Louis W. Thompson and assigned to the assignee of the present application.

The rheostat is provided with a plurality of spaced contacts or buttons 18 which are selectively connected to taps on the resistor 6. These buttons are selectively engaged by a moving contact 19 carried by a traveling nut on a threaded extension of the shaft of the motor 16 so that rotation of the motor in either direction will cause the moving contact 19 to make successive engagement with the buttons 18. When the moving contact 19 moves to the left, as viewed in the drawing, sections of the resistor are successively open-circuited, thus raising the excitation. Consequently, left-hand movement of the contact 19 is in the excitation raising direction and right-hand movement thereof is in the excitation lowering direction.

Ordinarily, of course, increases in load on the alternator tend to lower its voltage and consequently cause the regulator to increase its excitation but occasionally there will be voltage changes resulting from switching operations or changes in power factor which will cause the voltage to be higher than normal at times when the load is relatively heavy and with the present invention the regulator is automatically prevented from lowering the excitation below safe values which are consistent with stability and which values are automatically adjusted in proportion to the load on the generator.

For limiting the lowering movement of the contact 19 the rheostat is provided with a set of auxiliary buttons 20 which are engaged by an extension 21 of the contact 19. These auxiliary buttons are interconnected in sets so as to leave gaps 22 between them.

Gaps 22 are arranged to be bridged electrically by switches 23 to 23''' which are sequentially operated by a suitable mechanism 24 driven by the throttle 25 for the prime mover 1. The throttle in turn is controlled by a speed governor 26 which automatically positions the throttle so as to maintain substantially constant speed with variations in load thereon. The arrangement of the switches 23 and the mechanism 24 is such that when the throttle is closed, all the switches are closed. When the throttle moves in the opening direction the switches open successively beginning with 23''' so as to break the connections between the gaps 22 progressively in the direction from the maximum lowering to the maximum raising position of the rheostat.

The field winding 15 for controlling the operation of the motor 16 in the direction for causing excitation lowering operation of the rheostat is normally completed through at least one of the switches 23, the auxiliary buttons 20 and the extension 21 on the rheostat arm.

There is also provided means for automatically operating the rheostat in its excitation raising direction independently of the voltage regulator whenever the excitation is below a predetermined value and the throttle is open beyond a predetermined position. These predetermined values and positions are so correlated as to prevent instability or loss of synchronism. This means comprises a plurality of rheostat position operated switches 24 and 25 which are interconnected respectively with a plurality of throttle position controlled switches 26 and 27. As shown, the rheostat position switches 24 and 25 are actuated by an extension on the moving contact arm 21 of the rheostat and the throttle position switches 26 and 27 are actuated by a part of the mechanism 24 which is shown as consisting of a plurality of cams.

For preventing overtravel of the rheostat and resulting improper operation of the system the rheostat is provided with a raise limit switch 28 connected in series with the field winding 14 of the motor 16 and is also provided with a lower limit switch 29 connected in the circuit of the field winding 15.

The operation of Fig. 1 is as follows: The parts are illustrated in the positions corresponding to operation of the turbine generator 1—2 at approximately one-half load and with its voltage normal. Thus, the movable contact arm 19 of the rheostat and the movable contact arm 11 of the regulator are substantially midway between their extremes of travel. Assume now that the voltage of machine 2 changes but its load does not change. If the voltage increases, the moving contact 11 will engage the lowering contact 13 whereby a circuit will be completed from one side of a suitable source of control current through the contacts 11 and 13, then through the limit switch 29, moving contact arm 21, the left-hand ones of the center group of contact buttons 20, switch 23', the next group of contacts 20, switch 23, the left-hand group of contacts 20, the field winding 15 and the motor 16. This causes the motor to drive the rheostat in the lowering direction in which moving contacts 19 and 21 travel to the right, as seen in the drawing, thereby increasing the resistance of the field circuit of the exciter 4 and lowering the voltage of the main generator 2. Ordinarily, this action will continue until the voltage returns to normal whereupon the contacts 11 and 13 will separate and the motor 16 will come to rest. If, however, the drop in voltage is so severe that the regulator is not satisfied by the time the moving contact 21 crosses the gap 22 which is bridged by the switch 23'', the regulator lowering circuit will be opened because the switch 23'' is shown open. Consequently, the lowering action of the regulator is automatically limited by the throttle position because it is the throttle position which controls the position of the switch 23''.

If the voltage falls below normal the spring 17 will overpower the torque of the motor 9 whereby contacts 11 and 12 will engage each other, thus completing a raising circuit through these contacts, through the limit switch 28 and through the field winding 14 to the motor 16. This reverses the motor and causes the contacts 19 and 21 of the rheostat to move to the left, as viewed in the drawing, thereby successively cutting out sections of the resistance 6 and increasing the excitation and voltage of the main generator. Ordinary voltage fluctuations will require but a small amount of travel of the arm 19 in order to restore the voltage to normal whereupon the contacts 11 and 12 will open and the motor 16 will come to rest. However, the raising action is limited only by the limit switch 28 so that the rheostat may be run to its all-out or full-raise position under the control of the regulator.

The mechanism 24 for operating the switches 23, 23', 23'', and 23''' is shown as including a plurality of separate angularly displaced cams. These cams are rotated together clockwise in response to the opening of the throttle 25 and conversely they are rotated together counterclockwise in response to a closing motion of the throttle 25. Thus, if the throttle is moved in the closing direction from the position illustrated, switch 23'' will close first and if the closing motion is continued switch 23''' will finally close. Consequently, the more nearly the throttle is to its fully closed position the further the rheostat can go in the excitation lowering direction towards its all-in or minimum-excitation position to which it is limited by the limit switch 29.

Operating conditions may sometimes be such that the load increases but the voltage does not decrease. Under these circumstances instability may result from the fact that the excitation is not increased by the regulator. However, the switches 24, 25, 26 and 27 prevent the occurrence of instability under these conditions. For example, if the throttle opens a slight amount from the position shown, the switch 26 will be closed, thereby completing a circuit from one side of the source of control current through the switches 24 and 26 in series and thence through the limit switch 28 to the raising terminal of the motor 16. Consequently, the rheostat will automatically be operated in the raising direction independently of the voltage regulator. This action will continue until the extension on the movable contact 21 opens the switch 24. The opening of the switch 24 can be made to take place at a predetermined value of field current such, for example, as that corresponding to half load on the main machine. Similarly, if the rheostat is toward the right-hand extreme of its travel it will automatically be operated in the raising direction by a circuit which is completed through the switches 25 and 27 in series. The switch 27 is arranged to close at a lower value of load than the switch 26 and the switch 25 is arranged to be operated by the extension 21 on the movable contact at a lower value of excitation than that at which the switch 24 is operated. For example, this lower value of excitation can be the excitation required to produce normal voltage at no load.

In the embodiment of the invention shown in Fig. 2 the automatic raise control is obtained from a series of additional contact buttons 39 cooperating with switches 26, 27 and an additional switch 27' so as to provide three-step automatic raising control instead of two-step control as in Fig. 1.

In this figure the direction of rotation of the cams is the reverse of that for Fig. 1 for the same change in position of the throttle. Thus, clockwise rotation of the cams corresponds to closing motion of the throttle in Fig. 2 and counterclockwise rotation of the cams corresponds to opening motion of the throttle. Another and minor difference is that the switch 23''' and its cam have been omitted so as to provide fewer steps of automatic limitation of the lowering action of the rheostat under the control of the regulator.

The operation of Fig. 2 is the same as the operation of Fig. 1 except for that of the automatic raise control of the rheostat in accordance with the throttle position and independently of the regulator. Such operation is as follows: The rheostat is shown in a position which provides adequate excitation from the point of view of instability for all conditions of load. Should the rheostat be to the right of the gap which is bridged by the switch 27' a circuit would be completed from the positive side of the control source through switches 26 and 27 in series and then to the raising winding 14 of the motor 16, thus automatically raising the excitation until the moving contact of the rheostat crosses the gap bridged by the switch 27'. If, however, the throttle were closed slightly the switch 27 would be open so that the automatic raising circuit would not be completed until the rheostat was in the zone of contacts 30 to the right of the gap bridged by the switch 27. In this manner the degree of automatic raising will be proportional to the degree of throttle opening.

While there have been shown and described particular embodiments of this invention, it will be obvious to those skilled in the art that various changes and modifications can be made therein without departing from the invention and, therefore, it is aimed in the appended claims to cover all such changes and modifications as fall within the true spirit and scope of the invention.

What I claim as new and desire to secure by Letters Patent of the United States, is:

1. In combination, a prime mover, a throttle therefor, a synchronous generator driven by said prime mover, a motor operated rheostat for controlling the excitation of said generator, a regulator for controlling said rheostat including a circuit for operating said rheostat in an excitation lowering direction, a switch having a moving contact operated by said rheostat and having a plurality of sets of cooperating spaced contacts arranged along its path of movement, said circuit being completed through said moving contact and the cooperating contact which is engaged by said moving contact when said rheostat is in its extreme excitation raising position, a plurality of switches for respectively interconnecting said spaced cooperating contacts, and means responsive to the opening of said throttle for sequentially opening said switches so as progressively to disconnect said sets of cooperating contacts from each other starting with the last set of cooperating contacts at the excitation lowering end of the range of said rheostat whereby the amount of excitation lowering which said regulator can cause said rheostat to produce will decrease progressively as said throttle is opened.

2. In the combination as defined in claim 1, additional means responsive to both the rheostat position and the throttle position for positively operating said rheostat in its excitation raising direction independently of said regulator whenever said excitation is below a predetermined value when said throttle is open beyond a predetermined position.

3. In combination, a prime mover, a throttle therefor, a speed governor for controlling the position of said throttle so as to maintain the speed of said prime mover substantially independent of normal variations of load thereon, a synchronous generator driven by said prime mover, a motor operated rheostat for controlling the excitation of said generator, a regulator for controlling said rheostat including a circuit for operating said rheostat in an excitation lowering direction, said rheostat having a moving contact for cooperation respectively with sets of main and auxiliary contact buttons, said main contact buttons being connected respectively to taps in a regulating resistor, said auxiliary contact buttons being divided into interconnected groups, a plurality of switches for respectively interconnecting said groups of auxiliary contact buttons, means operative in accordance with changes in the position of said throttle for sequentially operating said switches, said circuit including said moving contact, said auxiliary buttons and said switches in series whereby the extent of the lowering action of said rheostat will vary inversely with the degree of opening of said throttle.

4. In the combination as defined in claim 3, a circuit for causing said rheostat to operate in an excitation raising direction, a set of additional contact buttons on said rheostat which are interconnected into groups and which are engaged by a moving contact on said rheostat, and a plurality of additional switches for interconnecting said groups of additional contact buttons, said additional switches being sequentially operated by said throttle, said additional buttons and additional switches being connected in said excitation raising circuit.

DELMAR D. CHASE.